United States Patent [19]

Jones

[11] 4,116,764
[45] Sep. 26, 1978

[54] APPARATUS FOR CONTROLLING NUCLEAR CORE DEBRIS

[75] Inventor: Robert D. Jones, Irwin, Pa.

[73] Assignee: The United States of America as represented by the United States Department of Energy, Washington, D.C.

[21] Appl. No.: 656,992

[22] Filed: Feb. 11, 1976

[51] Int. Cl.² .............................................. G21C 9/00
[52] U.S. Cl. ...................................... 176/38; 176/40; 176/87
[58] Field of Search ........................ 176/37, 38, 40, 87

[56] References Cited

U.S. PATENT DOCUMENTS

| 3,719,556 | 3/1973 | Snyder, Jr. et al. | 176/38 |
| 3,945,883 | 3/1976 | Hind et al. | 176/40 |
| 3,962,032 | 6/1976 | Berniolles et al. | 176/65 |
| 3,964,966 | 6/1976 | Lampe | 176/38 |

*Primary Examiner*—Samuel W. Engle
*Assistant Examiner*—Ralph Palo
*Attorney, Agent, or Firm*—Edward L. Levine; Z. L. Dermer

[57] ABSTRACT

Nuclear reactor apparatus for containing, cooling, and dispersing reactor debris assumed to flow from the core area in the unlikely event of an accident causing core meltdown. The apparatus includes a plurality of horizontally disposed vertically spaced plates, having depressions to contain debris in controlled amounts, and a plurality of holes therein which provide natural circulation cooling and a path for debris to continue flowing downward to the plate beneath. The uppermost plates may also include generally vertical sections which form annular-like flow areas which assist the natural circulation cooling.

11 Claims, 3 Drawing Figures

APPARATUS FOR CONTROLLING NUCLEAR CORE DEBRIS

BACKGROUND OF THE INVENTION

The invention described herein was made in the course of, or under, a contract with the Energy Research and Development Administration (ERDA), the successor in interest to the U.S. Atomic Energy Commission (AEC).

FIELD OF THE INVENTION

This invention relates to nuclear reactors, and in particular to a safety device which will contain, cool, and disperse core debris formed in the unlikely event of an accident causing core meltdown.

DESCRIPTION OF THE PRIOR ART

Since the inception of the commercial nuclear power industry, a prime concern of all parties involved has been safety. Regulatory bodies, commercial manufacturers, and operating utilities have spent vast sums in research, design and development of redundant systems and components to assure the safety of the public.

Governmental regulatory bodies define at least a portion of the safety related specifications for commercial and other types of nuclear reactor plants in terms of hypothetical accidents regardless of the likelihood of occurrence. One such unlikely hypothetical accident is based upon assuming certain conditions under which auxiliary systems, which are designed to support plant functions during normal operation and to provide emergency functions under accident conditions, fail to the degree that at least a portion of the reactor core and its related components melt into a flowing configuration. The core, and supporting components within the reactor vessel are assumed to melt under such circumstances. It has also been suggested that portions of the vessel itself may fail. It has further been suggested that if the debris is not cooled and dispersed it is theoretically possible, though unlikely, that a geometric configuration could form allowing at least a portion of the debris to attain criticality.

A number of apparatus have been disclosed for both internal-vessel and external-vessel use which will act to contain, cool, and control the configuration of the assumed molten debris. However, none of the prior art apparatus have provided the configuration taught by this invention. Most prior art teachings include extremely massive structures which act to "catch" the debris. Many include sacrificial components through which the debris melts. This is mainly a result of configurations which do not disperse the molten and extremely hot debris evenly, thereby allowing the melt front to collect and continue its downward path. Also typical are those apparatus which provide an active cooling system. Others include a plurality of smaller containers suspended from the core support structures which act to contain the debris, which, however, are limited in the amount of debris that may be contained. The drawback of many of these apparatus is their immense size and associated cost, as well as reliance upon active components. Those located externally, typically below the reactor vessel, would function only after significant additional damage, melting of the vessel itself, occurred, and also typically include massive structures with active components. In contrast, a passive system which begins to function early in the assumed accident provides greater control, and cooling by passive methods such as natural circulation would provide greater assurance of system reliability. Further, a less massive apparatus could be utilized in conjunction with many of the existing prior art systems if additional redundancy in safety oriented systems is desired. An apparatus which will, in the unlikely event of an accident, control core debris, or even delay its downward motion, will further ensure public and environmental protection as well as serve to maintain the high degree of safety demonstrated by the existing operating record of the commercial nuclear power industry.

SUMMARY OF THE INVENTION

The instant invention provides, in the main embodiment, an apparatus, affixed within the lower plenum of a primary reactor vessel of a nuclear reactor, which passively contains, cools, and disperses debris assumed to fall from the core area in the unlikely event of an accident resulting in core meltdown. It is primarily applicable to those reactors utilizing a liquid coolant including pressurized water reactors, boiling water reactors, and liquid metal cooled fast breeder reactors. The apparatus includes several layers of plates, vertically spaced atop one another, each including a horizontal section at the bottom portion of the reactor vessel. The horizontal sections include a large number of openings extending vertically through the plates, with container-like depressions about the openings. In the preferred embodiment circular openings and hemispherical depressions are utilized, giving the horizontal section the appearance of a flat plate with volcano-like structures attached. The openings are offset between successive plates such that substantially all of the openings are aligned directly above a depression in the plate below.

The uppermost plates include a primarily vertical section, extending upward from the horizontal section to form annular-like flow areas. The vertical section include inlet ports, which assist in providing a flow path for natural circulation cooling. A distributor structure affixed to the bottom of the vessel, may also be used to assist in support of the plates and provide additional paths for natural circulation cooling. Support rods may also be used between plates. In the preferred embodiment, a cylindrical hollow distributor with a convex top, to deflect debris to the plates, is used. The inside of the distributor contains horizontal sections with openings and depressions similar to the horizontal plates, as well as holes in the sides, which also assist in natural circulation cooling.

Under assumed accident conditions, debris will fall from the core area, be collected and dispersed along the uppermost plate until the depressions are filled, and will then spill over, through the openings, onto successively lower plates. Liquid coolant in the lower plenum will circulate through the annular areas and up through the openings, cooling the debris. A similar passive apparatus may also be utilized below the reactor vessel or in the annular region surrounding the reactor core.

BRIEF DESCRIPTION OF THE DRAWINGS

The functions and advantages of this invention will become more apparent from the following description and accompanying drawings, in which.

DESCRIPTION OF THE PREFERRED EMBODIMENTS

The instant invention evolved from safety considerations applied to nuclear reactor technology. It specifically provides in the main embodiment an apparatus, internal to the reactor vessel, which will contain, cool, and disperse molten debris formed in the unlikely event of an accident causing partial or complete core meltdown. The apparatus can be utilized in conjunction with any liquid cooled nuclear reactor contained in a vessel. It can also be utilized below the reactor vessel or in the annular region surrounding the reactor core.

Figure 1:
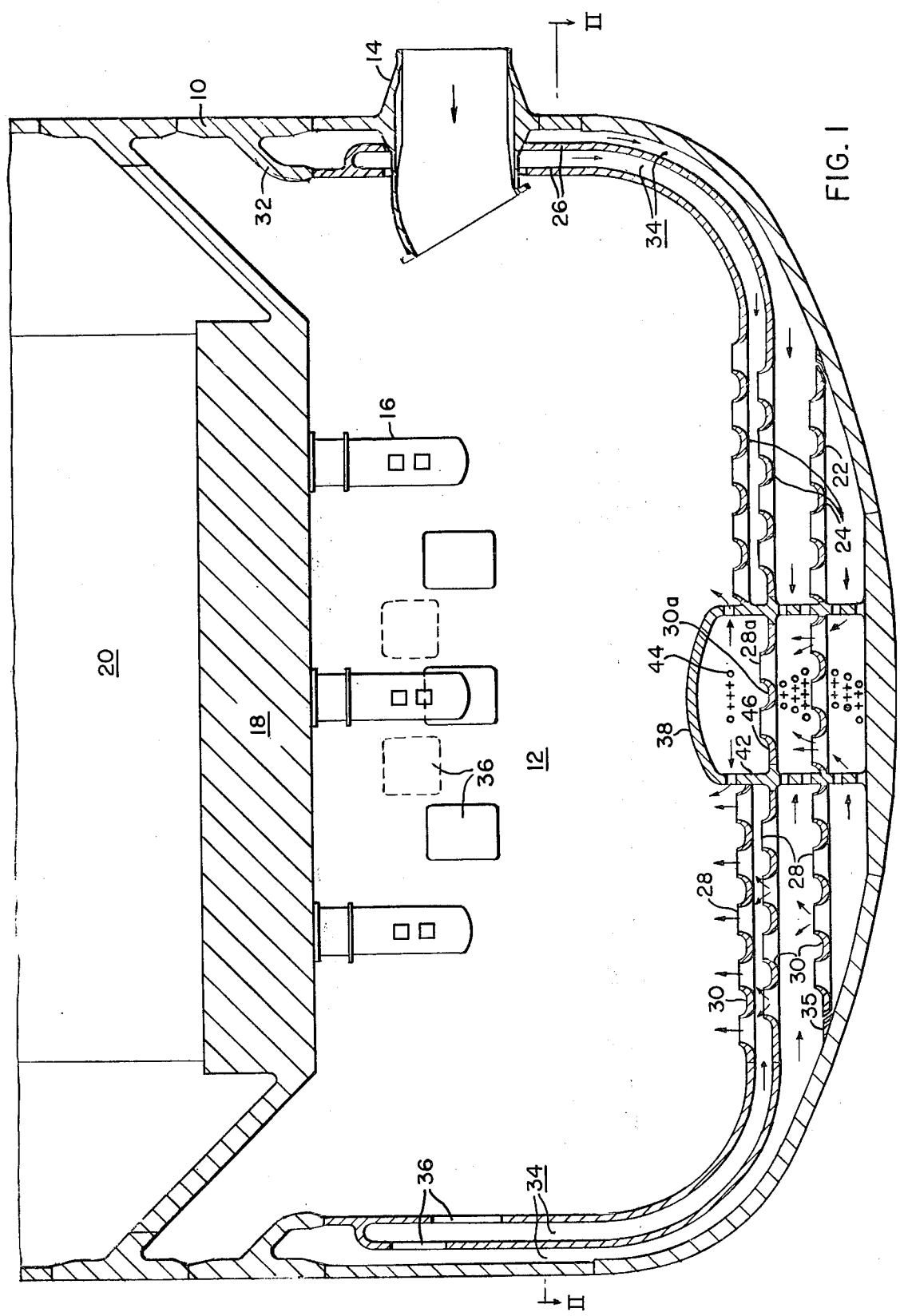
FIG. 1 is an elevation view, in cross-section, of the lower portion of a nuclear reactor incorporating the instant invention; ;p

Referring now to FIG. 1, there is shown a reactor vessel 10, the bottom portion of which may be referred to as the lower plenum 12. Although shown in cross-section, the vessel 10 is generally cylindrical, with a plurality of inlet nozzles 14. During operation, reactor coolant fluid, such as water or liquid sodium, enters the vessel 10 through the inlet nozzles 14, passes up through the lower core structure including inlet modules 16 and a lower core plate 18, enters the core 20 where it picks up heat from nuclear fissioning, and exits at the upper end of the vessel 10. The coolant then typically flows directly to a turbine-generator system or is passed through heat exchange means where it transfers heat to a utilization fluid which drives a turbine-generator system.

Figure 2:
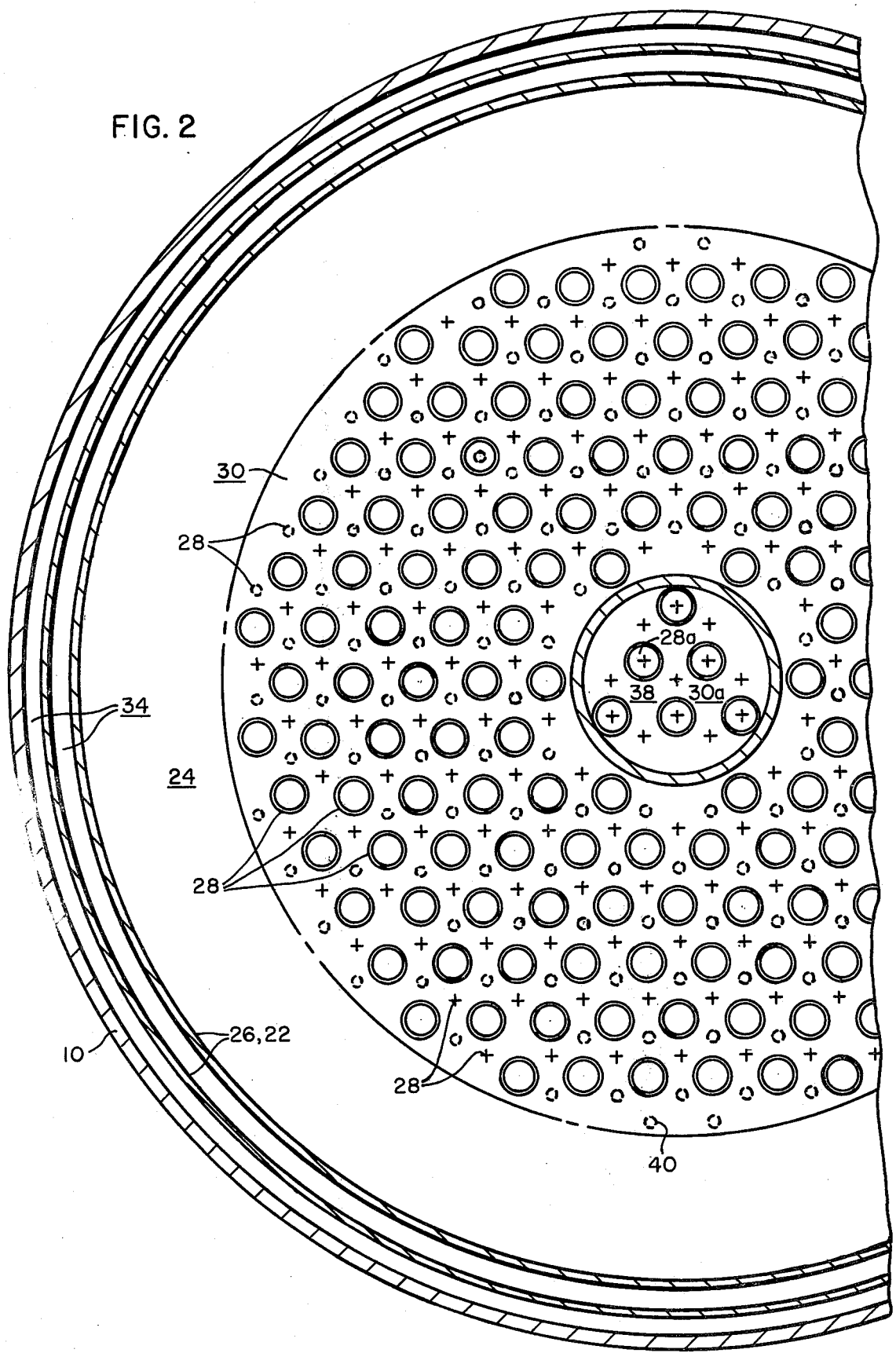
FIG. 2 is a plan view taken at II—II of FIG. 1.
Figure 3:
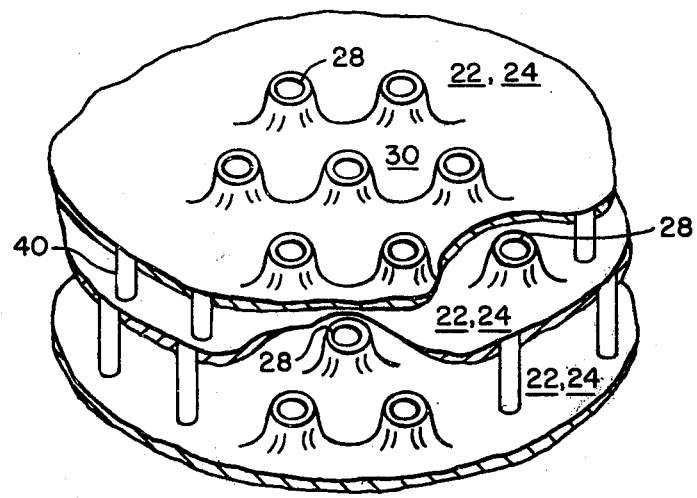
FIG. 3 is a perspective view of a portion of the plates shown in FIGS. 1 and 2.

The main embodiment of the instant invention is shown in the lower plenum 12. It includes a plurality of debris plates 22 which function to contain, disperse, and cool the debris formed in the unlikely event of an accident causing core meltdown. Under such unlikely circumstances, the debris will be of varying composition. It will include flowing liquid or molten composition resulting from melting of portions of the fuel typically comprising uranium, thorium, or plutonium, among others; the fuel assemblies, typically comprising low neutron absorbing materials such as alloys of zirconium; the core support structure, typically comprising steel alloys; and also including the coolant, such as water or liquid metals. It may also include solid chunks of these components, of varying size. Dependent upon the magnitude of meltdown, the plates 22 will totally contain, or at least delay, the debris which falls into the plenum 12 and which otherwise could theoretically melt through the bottom of the reactor vessel 10. All of the plates 22 include a generally horizontal section 24, and the uppermost plates also include a generally vertical section 26. The horizontal sections 24 include a plurality of vertical openings 28 through the plates, with depressions 30 thereabout, as shown in FIGS. 1 through 3. The depressions 30 shown are of generally hemispherical shape, and the openings are circular. Other geometric configurations may also be utilized. As shown best in FIG. 3, this gives the horizontal sections 24 the appearance of a plate with a multitude of volcano-like structures. The openings 28 and depressions 30 are staggered or vertically offset from those of the plate immediately thereebeneath. However, as shown, the openings 28 and depressions 30 in every other plate 22 may be vertically aligned. In FIG. 2, the "+" notation represents the center of the openings in the plate immediately beneath the uppermost plate.

The plates 22 are ultimately affixed to the vessel 10, preferably by means such as welding, although other fastening means may be utilized. Plates 22 with vertical sections 26 may be welded to vessel extensions 32, and/or affixed to one another at the upper portion of the section 26, as shown. This structure forms annular-like regions 34 between the plates and the vessel, and between successive plates. The lower plates 22, without vertical sections, may be circumferentially welded to vessel inserts 35. The annular regions 34 provide pathways for natural circulation coolant flow, the coolant entering through annulus inlet ports 36 in the vertical sections 26. The ports 36 between successive vertical sections 26 may be staggered both vertically and horizontally, such that the outer ports 36 (those farthest from the reactor vessel vertical centerline) are at a higher elevation, to assist natural circulation flow and minimize contact between hot debris and the vessel 10, as discussed further below.

For primarily structural functions, the invention may also include one or more distributors 38 and a plurality of support stays 40. The stays are affixed between depressions 30 in successive plates 22. A singular distributor 38 is shown centrally located, which is circular in cross-section, although other geometric shapes such as triangular, hexagonal, or octagonal, among others, could be utilized. The upper portion of the distributor 38 is convex, and raised above the uppermost horizontal section 24. The convex shape will deflect core debris onto the uppermost horizontal section 24. Side walls 42 of the distributor include a plurality of coolant circulation holes 44. The internal portion of the distributor 38 includes flow plates 46, with staggered vertical openings 28a and depressions 30a similar to the horizontal sections 24. The side walls 42 of the distributor are affixed to the bottom of the reactor vessel 10 by means such as welding, and are also affixed to the horizontal sections 24 to provide additional structural support.

During normal plant operation the lower plenum 12 is filled with reactor coolant, including the volume below the plates 22 and within the distributor 38. The large flow rate entering the vessel through the nozzles 14 provides sufficient mixing such that stagnant flow areas are alleviated. Further, the horizontal sections 24 of the plates 22 are desirably positioned at an elevation sufficiently below the inlet nozzles 14, and below the lower core plate 18 and inlet modules 16, such that the effect on coolant flow and system pressure drop during normal operation is minimal.

One of the major benefits of the instant invention is its passive character; there are no active components. This provides a maximum degree of reliability under assumed accident conditions because no active component can fail to function. During an assumed meltdown accident, the lower plenum will remain filled with reactor coolant. Generally, the debris including a flowing molten mass and some solid segments will fall downward, onto the uppermost horizontal section 24; a small amount will fall directly through some of the openings 28 in the uppermost horizontal section 24. As the debris will be of varying density, the higher density debris falls downward while lower density debris may be carried along in the currents of the surrounding liquid. Debris falling directly onto the top of the distributor 38 will also be deflected onto the uppermost plate. Due to the configuration of the horizontal sections 24, the debris will disperse along the plate until it reaches the level of the top of the openings 28, at which point the excess will overflow onto the depression 30 below. The relative height of the openings and depressions may be varied dependent upon the permissible depth of debris and the desired prevention of accumulation beyond a certain safe level. Dependent upon the amount of debris, this overflow will continue through successive plates, with some of the debris eventually resting on the vessel bottom.

The plates not only function to contain and disperse the debris, but will also provide flow paths for natural circulation cooling. The debris may be extremely hot, initially in the range of 7000° F., and must be cooled to slow or stop the melt front. Dispersing the debris across each plate 22 and among the different elevations will help to ensure that the debris will not attain a critical configuration which would generate additional heat energy. The molten debris, however, will not accumulate beyond a specified amount in any particular location because of the tendency to fill the depressions and then overflow.

The pool of coolant in the lower plenum 12 will, as shown by the arrows on FIG. 1, provide continued natural conduction and convection cooling. The hot debris collected on the horizontal sections 24 will heat the coolant, which will rise in the vessel. This creates a lower pressure region below the horizontal sections 24, and hence throughout the annular-like regions 34. Liquid coolant in the plenum 12 will therefore be drawn into the annular regions 34 through the annulus inlet ports 36, down toward the vessel bottom and the contained hot debris, to remove heat from the debris and then rise through the vessel 10. The inlet ports 36 are staggered to minimize the potential for blocking of the annular flow paths. The vertical configuration makes it unlikely that the hottest debris, that falling directly from the core area, or large solid chunks, will enter the annular regions 34. The staggered configuration makes it more unlikely that any debris entering the lowest and innermost ports 36 could enter the higher ports and therefore the regions closest to the vessel 10 wall. The staggered configuration also induces a change of direction and elevation in the coolant currents, thus assisting the higher density debris to drop out before entering the region adjacent the reactor vessel 10.

Delaying the time and decreasing the temperature at which debris contacts the vessel 10 wall decreases the possibility of localized vessel melting or failure. The distributor 38 not only provides additional structural support to the plates 22, but also additional natural circulation flow paths. The flow plates 46 within the distributor are preferably at the same elevation as the horizontal sections 24, except no flow plate 46 is provided at the uppermost plate 22 elevation. The circulation holes 44 are placed at an elevation above the corresponding depressions such that they are not blocked by contained debris. The absence of a flow plate 46 at the uppermost horizontal section 24 elevation encourages flow from the lower elevations. The invention will, however, provide the cooling function without any distributor 38.

The material of the components discussed should have good structural strength and temperature resistance, as well as reasonable compatibility with the debris. As the reactor vessel 10 is typically stainless steel, or carbon steel with a stainless internal cladding, a material such as 304 or 316 stainless steel is desirable. It should be noted that if, due to mass or temperature, the plates do fail, they will fail in succession, from uppermost to lowermost, thereby delaying the downward motion of the debris. The number of plates 22, annular regions 34, and distributors may be varied, within the constraint of maintaining sufficient distance between the bottom of the lower core plate 18 and the top of the invention apparatus. Similarly, the thickness of the plates 22 and the height and cross-section of the openings 28 may be varied. In the embodiment shown in the Figures, the minimum thickness of the plates 22 is one and one half inch, with a five and one-half inch diameter opening rising two inches above the top of the minimum thickness. The openings 28 are spaced on a twelve inch triangular pitch, although other spacing, dimensions, and arrangements may be utilized. The vertical distance between the uppermost plates is 4 inches, and nine and one half inches between the central and lowest plate. The bottom plate is approximately seven and one half inches above the internal bottom of the vessel. The annulus inlet ports 36, which may also be varied in size, shape, and position, are generally rectangular, the innermost being twelve inches by fifteen inches, the outermost being twelve inches by twelve inches. The lowermost port 36 centerline is approximately forty inches above the uppermost horizontal section 24.

It is apparent that the benefits resulting from the teaching of this invention, including the opening and depression configuration for dispersing, containing, and cooling by natural circulation of the core debris, may be utilized at other positions within, and even below the vessel 10 given a cooling pool in which the apparatus is submerged. For example, a series of horizontal plates with openings and depressions could be placed adjacent the core area, between the structure surrounding the core 20, typically referred to as a core barrel, and the reactor vessel wall. This would act to contain, cool, and disperse any debris that may be carried above and to the side of the core, which then melts through any standard structure in the annulus between the core 20 and the vessel 10. As another example, as many reactors include a type of guard vessel surrounding the lower portion of the reactor vessel 10, the teachings of this invention may be applied to the guard vessel, such that if, in the unlikely event the reactor vessel fails, reactor coolant will fall into the guard vessel and serve as the cooling pool. Further, there is nothing in the instant teachings that precludes the use of active cooling systems, if desired for additional redundancy. Also, the teachings do not preclude inclusion of a neutron poison in conjunction with the apparatus, such as making all or a portion of the support stays, or other components, of a material comprising neutron poison. It is therefore apparent that many modifications and variations are possible in light of the above teachings. It therefore is to be understood that within the scope of the appended claims, the invention may be practiced other than as specifically described.

I claim:

1. Apparatus for controlling debris resulting from meltdown of a nuclear reactor core normally cooled by a circulating liquid, said apparatus comprising a plurality of plates horizontally positioned beneath the core of said reactor and being in flow communication with said liquid under meltdown conditions, said plates disposed one atop another with a space therebetween, each said plate having a plurality of vertical openings therein each with a peripheral depression thereabout, adjacent openings being separated by a singular depression, said openings being spaced from one another such that substantially all of said openings are vertically aligned above a depression in the successively lower plate.

2. The apparatus of claim 1 wherein an elevational cross section through one of said plates taken between the centers of any two adjacent openings with a singular depression therebetween produces generally a two-dimensional U-shape having a horizontal top at each upper tip of said U-shape, a horizontal bottom within the concave interior cup of said U-shape, and a horizontal bottom of said U-shape.

3. The apparatus of claim 1 wherein a perspective view looking downwardly onto one of said plates appears as a flat plate with a plurality of volcanic shaped structures rising upwardly therefrom, said openings being the hollow centers of said volcanic shaped structures and said depressions being the conical exteriors of said structures and the top of said plate.

4. The apparatus of claim 1 wherein at least the uppermost of said plates includes a generally vertical section affixed to and about its extremity rising above said plate so as to form an annular-like region beneath and about said uppermost plate, said vertical section including inlet ports therethrough disposed below said core.

5. Apparatus of claim 4 including means for support of said plates between successive plates including rods affixed between depressions of said successive plates.

6. Apparatus of claim 4 wherein said apparatus is positioned within said vessel and comprises at least one distributor affixed to said vessel and said plates, said distributor having sides and a convex top at least a portion of which is above the uppermost of said horizontal plates, said sides having flow holes therethrough, and substantially horizontal segments affixed inside said distributor with distributor openings and distributor depressions about said distributor openings.

7. Apparatus of claim 4 wherein said openings are circular and spaced along said plates on a triangular pitch.

8. Apparatus for containing, dispersing and cooling debris resulting from meltdown of a nuclear reactor core normally cooled by a circulating liquid, said apparatus comprising a plurality of plates positioned within said reactor adjacent the core of said reactor, said plates disposed one atop another with a space therebetween, each said plate having a plurality of vertical openings therein each with a peripheral depression about said opening, adjacent openings being separated by a singular depression, the upper surface of the bottom portion of said depressions collectively forming a flat horizontal surface of said plate, said openings being spaced from one another such that substantially all of said openings are vertically aligned above a depression in the successively lower plate.

9. A nuclear reactor including a pressure vessel having a lower plenum and structure therein for accommodating the flow of molten debris resulting from meltdown of the nuclear core cooled by a liquid coolant comprising:
  (a) means within said plenum adjacent said vessel for directing said debris radially and downwardly under circumstances of core meltdown, said means including a plurality of horizontal plates vertically spaced from one another, each said plate having a plurality of vertical openings therethrough with a depression peripherally thereabout, said depression shaped generally as the bottom half of a torus in horizontal position, and
  (b) cooling means within said vessel arranged to channel said coolant into contact with said debris such that said coolant absorbs heat energy from said debris and freely rises due to natural circulation, said cooling means including an annular region adjacent the walls of said vessel, said annular region being in direct fluid communication with the space below one of said horizontal plates, and inlet ports disposed below said core and above the uppermost of said horizontal plates for inletting said coolant from said vessel into said annular region such that coolant from said vessel enters said annular region, flows generally downward to said space below one of said horizontal plates, and rises through said openings in said one plate due to natural circulation.

10. The nuclear reactor of claim 9 further comprising a distributor affixed to the bottom of said vessel and affixed to said horizontal plates, said distributor including side walls defining an internal portion and vertically spaced circulation flow holes in said side walls, whereby coolant flows into said internal portion through the lower of said flow holes and exits said internal portion through the uppermost of said flow holes.

11. Apparatus for controlling debris from meltdown of a nuclear reactor core normally cooled by a circulating liquid and disposed within a reactor vessel, said apparatus comprising at least an upper and a lower plate horizontally positioned in said vessel beneath said core and being ultimately affixed to said vessel, said plates disposed one atop another with a space therebetween, each said plate comprising a plurality of openings vertically therethrough with depressions about said openings, said openings spaced along said plates such that substantially all of said openings are vertically aligned above a depression in the successively lower plate, said plates each comprising a generally vertical section affixed about the periphery of said plates rising above the horizontal portion of said plates, said vertical secton of said lower plate section forming an outer annular-like region between said vessel and said vertical section and said vertical section of said upper plate forming an inner annular-like region between the vertical sections of said lower and upper plates, said vertical sections including inlet ports, said ports in the vertical section of said lower plate being at a higher elevation than said ports in the vertical section of said upper plate, at least one distributor having sides and a convex top, said distributor radially surrounded by said horizontal portions and affixed to said horizontal portions, said sides affixed to said vessel and having flow holes therethrough, at least a portion of said top being above the uppermost horizontal portion, and horizontal distributor plates affixed within said distributor including distributor openings with distributor depressions thereabout.
  whereby upon accidental meltdown of said core said debris falls generally downward through said liquid, some of said debris entering said annular-like regions through said ports and most of said debris falling onto said convex top and onto said uppermost horizontal portion being dispersed within said depressions until said depressions are filled, said debris then falling through said openings onto said depressions in the successively lower horizontal portion, said filling of depressions and falling through said openings continuing dependent upon the amount of said debris, and whereby due to the high temperature of said debris on said horizontal portions said liquid in said vessel circulates to cool said debris by natural circulation and convection, said liquid entering said ports, passing generally downward through said annular-like regions, and then generally upward through said openings in said horizontal portions and said distributor, and generally horizontally through said flow holes o said distributor, and whereby any chunks of debri entering said inner annulus tend to not enter sai outer annulus, adjacent said vessel, due to sai difference in elevation.

* * * * *